J. HOOK.
DENTAL FLOSS TAPE LIP PROTECTOR.
APPLICATION FILED JULY 24, 1919.
1,329,837.
Patented Feb. 3, 1920.
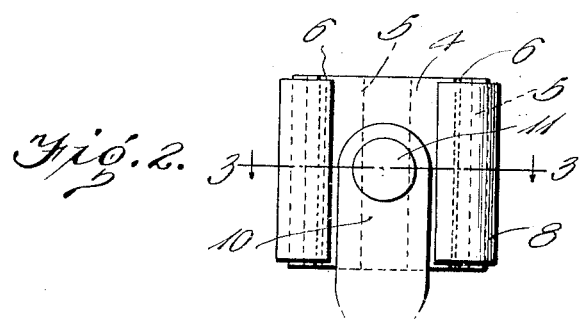
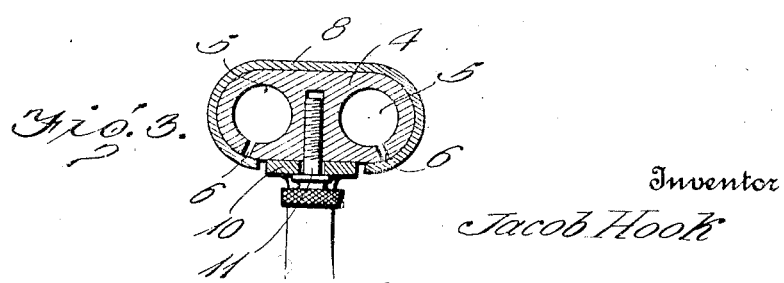
Inventor
Jacob Hook
By H. B. Willson & Co.
Attorneys

UNITED STATES PATENT OFFICE.

JACOB HOOK, OF RENO, NEVADA.

DENTAL-FLOSS-TAPE LIP-PROTECTOR.

1,329,837. Specification of Letters Patent. Patented Feb. 3, 1920.

Application filed July 24, 1919. Serial No. 313,115.

*To all whom it may concern:*

Be it known that I, JACOB HOOK, a citizen of the United States, residing at Reno, in the county of Washoe and State of Nevada, have invented certain new and useful Improvements in Dental-Floss-Tape Lip-Protectors; and I do declare the following to be a full, clear, and exact description of the invention, such as will enable others skilled in the art to which it appertains to make and use the same.

My invention relates to dental floss tape lip-protectors especially adapted to be used by dentists in cleaning between a patient's teeth.

Heretofore the practice has been, when cleaning the teeth with dental floss tape, to require the patient, or an assistant, to hold the lip away from contact with the tape by means of the fingers. This method is crude, tiresome and in most instances unsanitary, and in cases where an assistant is employed to hold the lip of the patient, it would be expensive.

It is therefore the object of this invention to overcome these circumstances by providing a device of the above mentioned character which is adapted to protect the lips, when cleaning with dental floss, from being cut or made sore.

Another object of the invention is to construct a device of the above mentioned character which is simple and effective, strong and durable and inexpensive to manufacture.

Other objects and advantages of the invention will be apparent during the course of the following description.

In the accompanying drawings forming a part of this specification and in which like numerals are employed to designate like parts throughout the same, Figure 1 shows my lip protector in use upon a patient, the outer shell being removed.

Fig. 2 is a bottom plan view of my improvement showing the removable shell applied thereto.

Fig. 3 is a vertical section on the line 3—3 of Fig. 2.

In carrying out my invention I employ means to guide the dental floss and means to keep the floss from coming into contact with the lips. I also preferably employ means for supporting and holding the device in proper position, so that the same may be easily manipulated.

In the accompanying drawings, wherein for the purpose of illustration is shown a preferred embodiment of my invention the numeral 4 designates a body preferably in the form of a rectangular block, the corners of which are rounded as shown so as to present a smooth surface to the lips. This block is to be made of any suitable anti-rust material such as rubber, aluminum, etc. In order that the floss may be reciprocated or pulled back and forth between the teeth I provide two guide passages 5 in the block 4. These passages 5 are preferably cylindrical in shape and are parallel with each other and extend from end to end of the block 4. Slightly off center and at the bottom of these passages 5 are shown slots or kerfs 6, which enable the floss 7 to be readily inserted and guided into the passages 5. I also preferably employ a removable shell or casing 8, of substantially the same shape as the block 4 to prevent the floss 7 from becoming displaced from the passages 5. This shell may be made of celluloid or similar material which is easily cleaned, thus affording a wholly sanitary device. As before stated the shell is removable and it will be seen that this feature is advantageous in that it may be taken off and washed or sterilized before using on a new patient.

I also employ a handle 9 to support the body 4 and properly position it to the various teeth. As shown the shank portion of the handle 9 is bent at its outer end and at approximate right angle to the body portion and is flattened as shown at 10. The handle 9 may be secured to the block 4 in any suitable manner, as for example by passing a set-screw 11 through an opening in the flattened portion 10 and threading it into the block 4, as shown more particularly in Fig. 3.

In operating the device, the operator first removes the shell or housing 8 from the block 4 so as to uncover the kerfs or slots 6. He will now take the free ends of the floss 7 in his hands forming a loop at the opposite ends, in the usual manner, and then insert the same through the kerfs or slots 6 and thence into the passages 5. The patient, or person upon whom the cleaning is being done, will grasp the supporting handle 9 in any convenient manner and hold the device in the proper position, and in front of the particular teeth to be cleaned. It will now be obvious that the floss, when reciprocated, will be guided by means of the passages 5 and will also be held from contact with the lips, thereby preventing them from being cut or made sore.

In cases where the shell 8 is removed and not used, as shown in Fig. 1, it will be obvious that the floss will be held from displacement from the passages 5 because of the upward pull exerted by the operator upon the free ends of the same.

It is to be understood that the form of my invention herein shown and described is to be taken as a preferred example of the same, and that various changes in the shape and size, and arrangement of parts may be resorted to without departing from the spirit of the invention or the scope of the subjoined claims.

Having thus described my invention, what I claim is:

1. A device of the character described comprising a handle adapted to be supported by a patient, and a body to be braced against the surface of the teeth and having a pair of spaced guide openings through which a dental floss is passed and held from contact with the lips.

2. A device of the character described comprising a handle adapted to be supported by the patient, a body having passageways therethrough and kerfs arranged away from the bearing surface of the floss tape when in operation, substantially as set forth.

3. A device of the character described comprising a handle adapted to be held by a patient, a body to be braced against the surface of the teeth and including passageways therethrough and kerfs communicating with said passageways, a guard to cover said kerfs and prevent displacement of the floss from the passageways, substantially as set forth.

4. A device of the character described comprising a handle, one end of which is adapted to be grasped by the patient and the opposite end of which is bent at an approximate right angle to the body portion and is partially flattened; a body having openings therethrough and detachably secured to said flattened portion of the handle, substantially as set forth.

5. A device of the character described comprising a handle adapted to be supported by a patient, a body to be braced against the surface of the teeth and including passageways therethrough and kerfs arranged in proximity to said passageways, a guard in the form of a split-sleeve adapted to cover said kerfs, substantially as described.

6. A device of the character set forth comprising a handle adapted to be supported by a patient, and a body to be braced against the surface of the teeth and having a pair of spaced guide openings extending therethrough and provided with entrance portions restricted in size for the insertion of the floss, substantially as set forth.

7. A device of the character described comprising a handle to be supported by a patient, a body to be braced against the surface of the teeth and including a pair of spaced guide openings extending therethrough and through which a dental floss is passed and held from contact with the lips, and means to prevent displacement of the floss from said openings.

8. A device of the character described comprising a handle adapted to be supported by a patient, a body to be braced against the surface of the teeth and having a pair of guide passageways extending therethrough and kerfs communicating with said passageways when in operation, and a removable and slidable sleeve adapted to cover said kerfs, substantially as described.

In testimony whereof I have hereunto set my hand.

JACOB HOOK.